March 3, 1964 D. B. LONES ETAL 3,123,754
FLUID PRESSURE TRANSDUCER SYSTEM
Filed Aug. 1, 1958 2 Sheets-Sheet 1

INVENTORS:
DAIN B. LONES,
JAMES W. PADGETT,
BY
Attorney

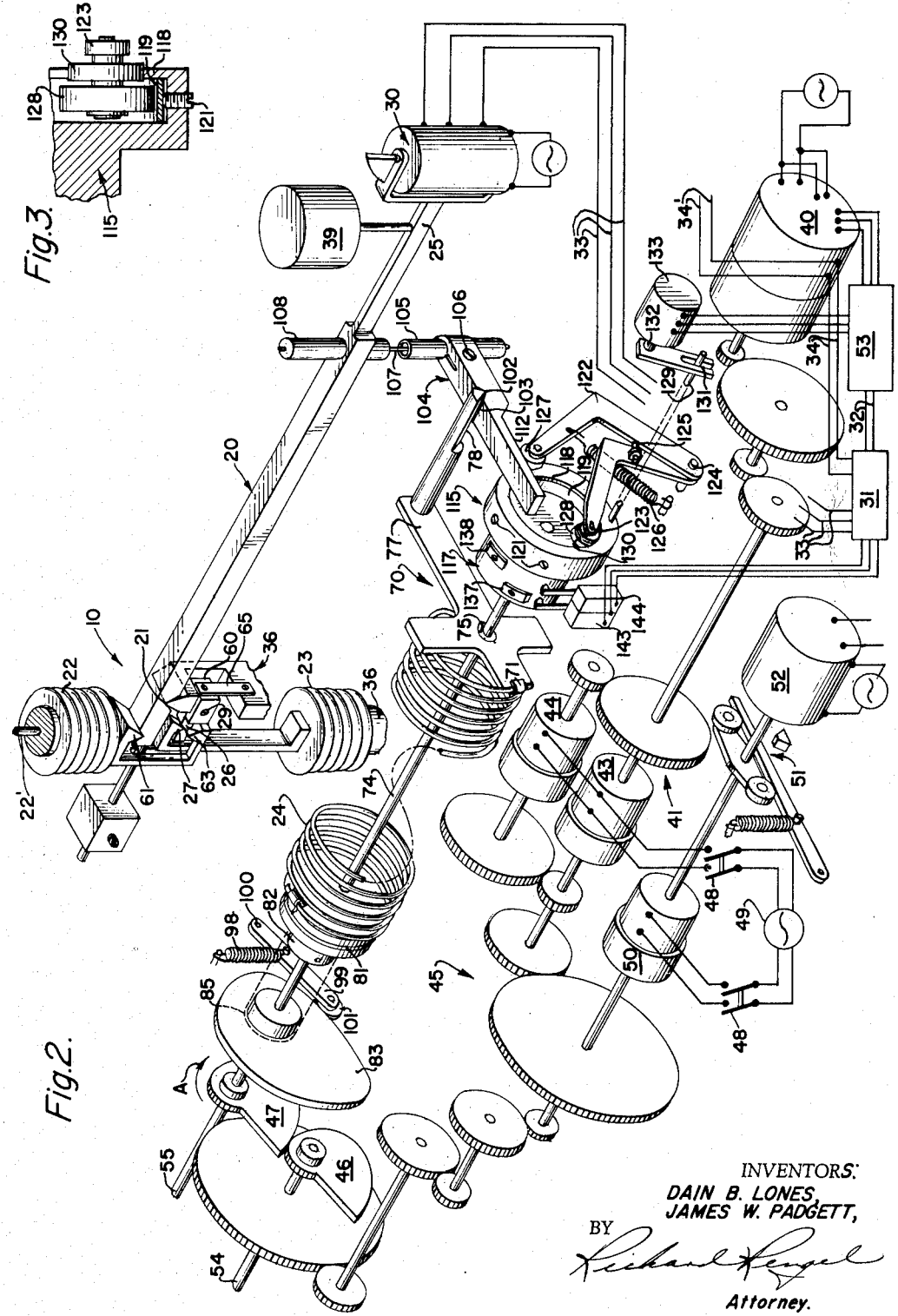

3,123,754
FLUID PRESSURE TRANSDUCER SYSTEM
Dain Beverly Lones, Palos Verdes Estates, and James W. Padgett, Rolling Hills Estates, Calif., assignors to The Garrett Corporation, Los Angeles, Calif., a corporation of California
Filed Aug. 1, 1958, Ser. No. 752,633
7 Claims. (Cl. 318—32)

The present invention relates to fluid pressure systems and more particularly to regulated fluid pressure transducer systems for producing output quantities which are a function of fluid pressures coupled to the system.

Often fluid pressures are sensed by a pressure transducer to provide useful outputs. In aircraft, air data computing systems include atmospheric pressure altimeter systems which provide both electrical and mechanical outputs for control of the flight of the aircraft, e.g. control of the flight by an autopilot. These output quantities, which are functions of true static or atmospheric pressure, are necessarily precise in order to maintain preset altitudes and to control the rate of ascent or descent.

Typical output quantities of altimeter systems are static pressure, log of static pressure or altitude, incremental, log of static pressure, and rate of change of log of static pressure. These outputs are required to be extremely accurate due to the speed of the aircraft in which they are being employed. Further, the response of the system must be very rapid, without oscillation or hunting, for the slightest error, slow response, or oscillation will produce an erratic flight pattern of the aircraft and excessive oscillation of the aircraft about a preset altitude.

Other specific requirements of the altitude control systems include the elimination of non-linearities of components in the system and errors resulting therefrom and maintaining substantially a predetermined signal level in the system for improved and uniform response over the entire range of operation.

Accordingly, it is an object of the present invention to provide a system which embodies the foregoing features and advantages.

Another object of the present invention is the provision of an electrical fluid pressure transducer system.

A further object is to provide a fluid pressure transducer system having a fast response without oscillation for producing output quantities which are extremely accurate.

Still another object of the invention is the provision of a regulated atmospheric pressure altimeter system for producing an output quantity which is a function of the altitude of an aircraft in flight.

A still further object is to provide a regulated atmospheric pressure altimeter system embodying variable kinematic chain, for transmitting forces and motion in accordance with an adjustable control element.

A further object is the provision of a compensating arrangement for pressure transducers.

Another object of the invention is the provision of a regulated pressure transducer system wherein the signal level is automatically adjusted to afford increased uniformity over the operating range of the system.

Other objects and features of the invention will become apparent to those skilled in the art as the disclosure is made in the following detailed description of a preferred embodiment of the invention as illustrated in the accompanying drawings, in which:

FIG. 2 is an isometric exploded view of the preferred embodiment of the invention;

FIG. 3 is an enlarged sectional view of a detail of the preferred embodiment illustrated in FIG. 2;

Figure 1:
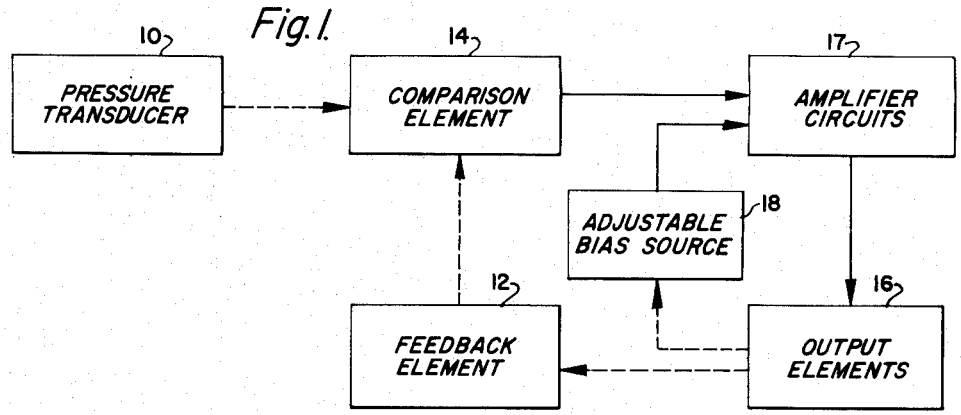
FIG. 1 is a block diagram of a preferred embodiment of the invention.

Referring now to the drawings, wherein like reference characters designate like or corresponding parts throughout the several views, there is shown in FIG. 1 a fluid pressure transducer closed loop regulated system including a pressure transducer 10 for sensing ambient fluid or atmospheric pressures and producing an output force proportional thereto, and a feedback element 12 coupled to a system output which is proportional to said fluid pressures and responsive thereto for producing a counterforce output. The output forces of the pressure transducer and feedback element are mechanically coupled to a comparison element 14 for comparing the actual output of the system, which is proportional to pressures as introduced into the comparison element through the feedback path, and the output force of the transducer 10, which is proportional to ambient pressures.

Preferably, the comparison element 14 includes circuit means for producing an electrical signal which is proportional to the difference between the transducer input and feedback forces, which difference is converted to an electrical signal proportional thereto.

The signal derived from the comparison element 14 is matched to the driving requirements of the output element 16 by means of appropriate amplifier circuits 17.

Often, as in pressure type altimeter equipment, the output elements are driven exponentially, or at an increasing rate, with decreasing fluid pressures. In atmospheric or static pressure altimeter systems, for example, where the static pressure decreases exponentially with increasing altitude, the resulting non-linearity may be provided for in the system either electrically or mechanically, for example as shown in the drawings by cam gears.

As pressure decreases with altitude it causes a change in signal level which can be compensated for by an adjustable bias source 18 that is preferably driven by a mechanical system element having an output proportional to static pressures. The output of the adjustable bias source is a bias signal which may be a current or voltage varying in amplitude so as to vary the gain of the amplifier circuits and thereby maintain the signal level and power in the system at a more uniform level.

Referring to FIG. 2 for a detailed description of the preferred embodiment of the regulated fluid pressure transducer system, the pressure transducer 10 comprises an evacuated bellows 23 having one end fixed to a base 36 and a static pressure bellows 22 which is vented to atmospheric pressure by a tube 22' connecting to the static openings of a pitot-static tube, not shown. The evacuated bellows 23 compensates for output variations of the pressure bellows 22 which are not the result of static pressures, including the response of the bellows 22 to fluid pressures in the chamber surrounding the latter bellows and other variations excluding atmospheric pressures coupled to the bellows 22 by the tube 22'.

In order to transmit the resultant force developed by the static pressure bellows 22 and the evacuated bellows 23 to a balance beam 20, an adjustable coupling arrangement is provided in which only the resultant output force of the evacuated and pressure bellows is applied to the beam, a detailed description of said arrangement being set forth hereinafter.

Beam 20 is fulcrumed at 21. The counterforce output developed by the transducer feedback loop is proportional to atmospheric pressure and is applied to the beam 20, at the side of the fulcrum 21 opposite the bellows 22, 23, through a torsion spring 24. Such counterforce, or feedback force, is compared to the force exerted on the beam by the bellows 22, 23, any unbalance of the moments of these forces resulting in a displacement of the beam by an amount which is a measure of the unbalance or error in the servo or feedback loop.

The beam displacement is detected by a differential transformer 30 having a movable core carried between the spaced members of a bifurcated extension 25. Preferably, the direction and amount of displacement of the transformer core determines the amplitude and phase of the output signal which is coupled to a preamplifier 31 by leads 33, the movement of the beam 20 being dampened by a dash-pot 39. The effect of temperature variations on the comparison element may be substantially eliminated by bimetallic or other compensating elements (not shown) coupled to the movable core of the differential transformer 30.

The output of the preamplifier 31 is coupled to power amplifier 53 by leads 32 where the signal level is raised to drive the servo motor-tachometer 40. The direction and speed of the motor are determined by the phase and amplitude of the amplified signal from the differential transformer 30. The amplitude of the electrical output of the tachometer is proportional to the rate of change in log of atmospheric pressure and is coupled to an automatic pilot or other equipment, as desired, by leads 34'. The rate of pressure change signal is coupled back to the preamplifier by leads 34 to provide a negative or degenerative feedback for stabilizing the preamplifier.

A transmission mechanism 41 couples the rotational output of the motor-tachometer 40 to electromagnetic clutches 43 and 44. One of the clutches, depending upon the speed of the system, is engaged to drive a subsequent transmission mechanism 45 to provide a mechanical output proportional to log of atmospheric pressure or altitude at a shaft 54 and an output proportional to atmospheric pressure at a shaft 55. The logarithmic cam gear coupling including cam gears 46 and 47 converts the rotation of the shaft 54, which is proportional to change in log of atmospheric pressure, to angular rotation of shaft 55 which is proportional to change in static pressure.

In addition to the mechanical outputs, an electrical output proportional to variations from a reference altitude is provided by a synchronous transmitter 52 coupled to the transmission through a clutch 50. All electromagnetic clutches are coupled to a source of control power 49 through respective supply lines and switches 48. Coupling of the control power to the electromagnetic clutches causes the clutch 43 and a clutch 50 to drive their respective output shafts, while control power applied to clutch 44 disengages its input and output shafts. The alternate paths provided through electromagnetic clutches 43 and 44 provide for regulation of speed through the transmission mechanism 45.

It will be apparent from the foregoing that a number of both mechanical and electrical system outputs which are functions of the atmospheric pressures or altitudes are available; the first being the electrical signal representing rate of change in log of atmospheric pressure which may be taken from line 34' coupled to the motor-tachometer 40, the second being the electrical signal from transmitter 52 representing the incremental change in log atmospheric pressure or incremental change in altitude from the altitude selected by energization of the clutch 50, the third being the rotation of shaft 54 representing change in log of atmospheric pressure, and the fourth being the rotation of shaft 55 representing change in atmospheric pressure.

Referring now to the feedback portion of the system, the non-linearity in torque of the torsion spring 24 and other undesired non-linearities in the system may be reduced or substantially eliminated by a feedback compensating arrangement including a retainer 70 which is adapted to be clamped to one end of the coil spring 24 by suitable clamping means 71 positioning the end of the coil around a shaft 74 and bearing 75. The retainer member 70 has an extension 77 and a transverse member provided with a knife edge 78 for coupling the spring torque from the extension of the retainer 70 to a lever member 104 and balance beam 20. The opposite end of the coil of the torsion spring 24 is securely clamped to a circular plate 81 which is held in position on a hub 82 coupled to a cam 83 by a suitable friction sleeve 85. The sleeve 85 provides a friction coupling between the hub 82 and the cam 83, whereby the torque of the spring 24 may be adjusted. This arrangement is particularly suitable for adjustments preliminary to or at the time of installation in an aircraft.

The preload from the spring 24 tends to turn the cam gear 47 in the direction of the arrow "A." As illustrated, the cam gears 46 and 47 are positioned for the maximum altitude within the range of the system. In order to maintain approximately the same gear tooth load with varying spring torque over the operating range of the system, a backlash arrangement includes a coil spring 98 acting on an arm 99 pivoted to the base at a point 100, and a roller 101 riding on the periphery of the cam 83. As the atmospheric pressure is increased, such as at lower altitudes, the extended lobe of the cam 83 acting against the force of the spring 98 decreases the torque transmitted from the torsion spring 24 to the cam gear 47 for uniform loading of the cam gears.

The output of the feedback system, the counterforce, is applied to the beam 20 through the arm or extension 77 of the retainer 70, knife edge 78 engaging the subbeam or lever member 104 at a V-slot 103. The far end of the arm 104 is coupled to the beam 20 by tubular member or conduit 105 received in the opening in the arm 104 and fastened thereto by a screw 106. The tubular member 105 retains one end of a wire flexure 107 while the other end is retained by a tubular member 108 passing through and secured to the balance beam 20.

Within the feedback arrangement an adjustable torque coupling means has been provided for modifying the counterforce applied to the balance beam through the feedback path to compensate for undesirable non-linearities in the system over the entire range of its operation. The lever member 104 is provided with a movable fulcrum 122 for varying the force applied to the balance beam from the knife edge 78. The fulcrum 122 is movable under the undercut portion 112 of the lever member 104. The position of the movable fulcrum is controlled by a cylindrical cam 115 coaxially secured to the end portion of the shaft 74. On the inner periphery of the cam's cylindrical portion, a thin flexible band forming the cam surface 119 is retained by an inwardly extending circular flange 118.

Around the outer periphery of the cylindrical portion of the cam, and preferably located centrally between the edges thereof, are a plurality of threaded openings extending through the cylindrical portion to receive set screws 121 for warping the thin flexible band 119. The lobes or irregularities in the cam surface provide for linearity adjustments including the torsion spring linearity adjustments.

The fulcrum 122 is biased against the arm of a cam follower 123 to move the fulcrum in accordance with the cam surface. Both the cam follower and the movable fulcrum are pivoted to a base at 124 and are initially adjusted relatively to one another by a set screw 125 threaded through a lug or the like on the arm of the cam follower 123, whereby adjustments of the set screw position the arm of the movable fulcrum relative to the cam follower against the force of coil spring 126. Preferably, the movable fulcrum 122 includes a roller 127 rotatably secured to the end of the fulcrum arm and adapted to ride on the lower surface of the undercut section of the lever member 104.

Similarly, a pair of rollers 128 and 130, shown in the enlarged detail sectional view in FIG. 3, are carried on the end of the arm of the cam follower 123. The rollers 128 and 130 are coaxially carried on the end of the cam follower and laterally adjacent one another, whereby the roller 130 provides a reference position when riding on the circular flange 118. In the absence of lobes or linearity adjustments of the flexible cam surface 119, the cam follower remains stationary as the roller 130 rides on the circular flange. Cam lobes formed by the flexible cam surface 119 engage the roller 128 to move the cam follower and the movable fulcrum for varying the lever arms of the lever member and eliminating undesired non-linearities in the counterforce applied to the beam 20.

Located adjacent the cylindrical cam 115 is a drum 117 coaxially mounted on the shaft 74 passing through the bearing 75. Adjacent the periphery of the drum 117 is a pair of longitudinally adjacent limit switches 143 and 144 having switch arms in the path of actuating strips 137 and 138, respectively, on the drum 117. The actuating strips project sufficiently from the cylindrical surface of the drum 117 to operate the respective limit switches 143 and 144, the switches being coupled to the pre-amplifier 31 so as to reverse the phase of the signal applied to the motor-tachometer 40 and thereby cause a corresponding reversal in the rotational direction thereof. This feature is provided to limit the rotation of the shaft 74 to less than 360°, the exact limits of the angular rotation being determined by the positioning of the actuating strips 137 and 138. In an embodiment of the system wherein the angular rotation is limited to 270°, the bevelled edges of strips 137 and 138 are separated by 90° as viewed in FIG. 2. The limiting arrangement permits the system to adjust to a new range of pressures or altitudes without a delay in response. If desired, a single limit switch may be used to provide the foregoing function by peripheral alignment of the strips 137 and 138 with the limit switch's actuating member.

Referring now to the apparatus for controlling or adjusting bias and the signal level of the system, a rod 129, projecting longitudinally from the cylindrical cam 115, engages a clevis 131 which is mounted for rotation on a shaft 132 of the gain control potentiometer 133. The shaft of the potentiometer is mounted coaxially with the shaft 74 of the torsion spring for direct linear coupling with the cylindrical cam 115. Since the system, as shown, is at the higher end of its pressure or altitude range, the potentiometer 133 is providing for maximum gain of the amplifier 53 to maintain the signal level and power in the system substantially constant and compensate for the decrease in variation of pressure for a given change in altitude at higher altitudes.

Figure 4:
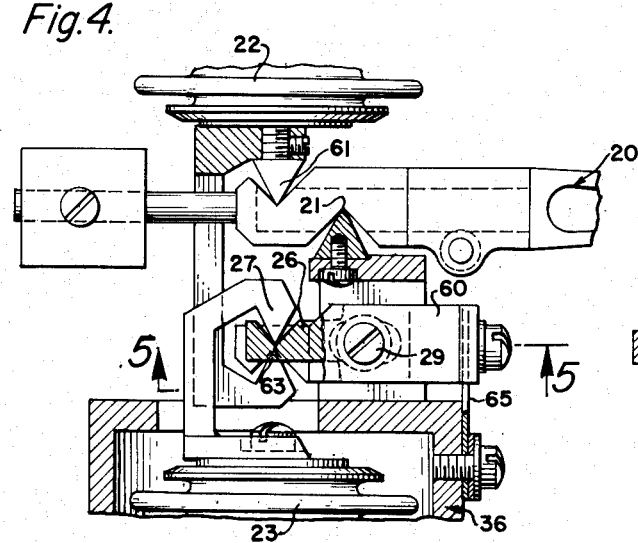
FIG. 4 is a detailed sectional view of a portion of the transducer.

Referring to FIG. 4 for a detailed description of the bellows coupling to the balance beam 20, the pressure bellows 22, which is responsive to static pressure, is coupled to the beam 20 by a linkage including a knife edge 61. A second set of adjacent knives 63 are supported in spaced relation and are directed to have their knife edges opposing the pressure bellows 22 and a knife edge 27 which is coupled to the evacuated bellows 23.

Figure 5:
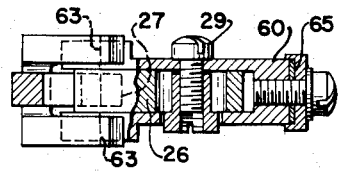
FIG. 5 is a sectional view taken along the line 5—5 of FIG. 4 looking in the direction of the arrows.

As shown more clearly in FIG. 5, a yoke 60 is adapted to receive the knife edges 63 in respective V-shaped slots. A slidable member 26 is adjustably secured in the yoke 60 for controlling the moment of the evacuated bellows 23 thereby compensating for differences in the effective areas of the bellows 22 and 23. A screw 29 releasably secures the adjustable member 26 to the yoke 60. It is seen therefore, that the knife edges 63 and the knife edge 27 are not necessarily directly in alignment and equidistant from their common fulcrum formed by the flexible member 65 unless the bellows areas are equal, and knife edge 27 is adjustable laterally relative to the knife edges 61 and 63 to compensate for any deviations in moments resulting from area mismatching of the pressure and evacuated bellows.

The yoke 60 is movably coupled to the base 36 by the flexible member 65 which is secured to respective parts by suitable means such as the bolts shown, thus allowing for relative movement of the knife edges seated in the V-shaped slots in the yoke 60 and the adjustable member 26.

In operation the transducer system adjusts as the pressure bellows 22 detects an atmospheric pressure change coupled to it through tube 22'. The change in atmospheric pressure, which it is assumed results from a change in altitude in the present embodiment, unbalances the beam 20. The unbalancing of the beam displaces the core of the differential transformer to produce a linear A.C. output of one of two phases.

The amplitude of the output signal of the differential transformer 30 is proportional to the displacement of the transformer core. This signal however is insufficient in amplitude to drive the motor-tachometer 40 and, therefore it is coupled to the pre-amplifier 31, where it is amplified and coupled to the power amplifier to provide an amplified output signal capable of driving the motor-tachometer 40.

In the preferred arrangement, the motor-tachometer has an electrical output signal proportional to the rate of change in altitude or log of pressure. This output signal is coupled back to the pre-amplifier as a regenerative feedback signal. The transmission 41, 45, preferably a multistage spur gear train, is driven by the motor-tachometer to provide a mechanical output in the system in which the position of shaft 54 is indicative of log of atmospheric pressure or altitude and the position of shaft 55 is indicative of atmospheric pressure. The cam gears 46 and 47 coupled to shafts 54 and 55 convert altitude or log of atmospheric pressure movements to atmospheric pressure movements, while within the gear transmission, the electromagnetic clutches 43 and 44 and associated spur gears provide for a speed changing function in which two-speed modes have been provided. The low speed mode is used under normal operating conditions, while the high speed transmission is required for fast tracking rates which are necessary, for example, during aircraft slewing conditions.

In the preferred arrangement, the feedback element includes the precision torsion spring 24 which is coupled to the pressure output shaft 55 through an adjustable sleeve 85, for initially adjusting the torque of the torsion spring, and an anti-backlash arrangement including the cam 83 and cam follower 99.

The feedback or torsion spring output is coupled to the beam to provide a counterforce which is proportional to the atmospheric change in pressure as seen by the actual output of the system on shaft 55. The torque from the torsion spring 24 is coupled to the beam 20 by a variable coupling arrangement for modifying the force applied to the beam through the feedback path over the range of operation of the system. This arrangement includes a movable arm and knife edge coupling the torque from the spring to the lever member 104. The movable fulcrum 122 varies the lever arm of the knife edge and the movable fulcrum, in turn, is controlled by the cam and cam follower which has been adjusted to correct for the undesired non-linearites in the system including the non-linearities of the torsion spring 24.

In addition to the rate of change in altitude output derived from the tachometer, which is also a function of the rate of climb and descent in pressure altimeters, a second electrical output is provided which is a pressure or altitude signal derived from the synchronous transmitter 52. The clutch 50 engaging the synchronous transmitter may be energized automatically or manually at any given altitude within the range of the system. The synchronous transmitter output signal will be proportional to the incremental change in altitude from said given reference altitude. A return-to-null mechanism is shown at 51. The incremental signal may be used to control an aircraft by the autopilot to maintain the aircraft's altitude within very close limits of the predetermined reference altitude. The signal is also useful in air data computers.

In the preferred arrangement, the rotational shaft outputs which are proportional to altitude and pressure, cover the full range of altitude and pressure in approximately 180° rotation. The altitude output shaft has high torque transmission characteristics and may be used to drive a variety of mechanical or electrical readout devices. In addition to being coupled to the feedback elements, the output shafts may also be directly connected to an air data computer to drive various pressure function devices. The rotation of the pressure shaft output is proportional to atmospheric pressures and may be utilized in the same manner as the altitude output shaft with respect to atmospheric pressure functions instead of altitude functions.

While the invention has been described by reference to a preferred embodiment thereof, it is understood that numerous variations thereon will be apparent to those skilled in the art, and it is our intention that all such variations falling within the spirit and scope of the invention be secured to us by U.S. Letters Patent.

We claim:

1. A fluid pressure transducer which comprises: a balance beam supported for a movement about a fulcrum; pressure responsive bellows means operatively connected to said balance beam for movement thereof; electrical means adapted to produce a signal indicative of the movement of said balance beam; motor means rotating an output shaft and a feedback shaft in response to said signal, the rotation of both of said shafts being related in magnitude and direction to the movement of said balance beam; spring means operable to apply a force to said balance beam in proportion to the rotation of said feedback shaft, the direction of said force being such as to oppose the movement imparted to said balance beam by said bellows means; and means operable in accordance with the position of said feedback shaft to modulate the signal produced by said electrical means.

2. A fluid pressure transducer which comprises: a balance beam supported for movement about a fulcrum; pressure responsive bellows means operatively connected to said balance beam for movement thereof; electrical means adapted to produce a signal indicative of the movement of said balance beam; motor means rotating an output shaft and a feedback shaft in response to said signal, the rotation of both of said shafts being related in magnitude and direction to the movement of said balance beam; a torsion spring having one end operatively connected to said feedback shaft so as to develop a force proportional to the angular position thereof; a lever connected to the other end of said torsion spring whereby said force may be transmitted to said balance beam so as to oppose the movement imparted thereto by said bellows means; a relatively movable fulcrum supporting said lever, the position of said fulcrum being effective to control the magnitude of the force transmitted by said lever to said balance beam; cam means rotated by said feedback shaft, the profile of said cam means corresponding to known deviations from the desired response of said transducer; follower means operable to move said fulcrum in accordance with said cam profile, thereby to vary the force transmitted to said balance beam by said lever so as to compensate for said deviations; and means operable in accordance with the position of said feedback shaft to modulate the signal produced by said electrical means.

3. A fluid pressure transducer which comprises: a balance beam supported for movement about a fulcrum; pressure responsive bellows means operatively connected to said balance beam for movement thereof; electrical means, including an amplifier, adapted to produce a signal indicative of the movement of said balance beam; motor means driving an output shaft and a feedback shaft in response to said signal, the rotation of both of said shafts being related in magnitude and direction to the movement of said balance beam; a torsion spring having one end operatively connected to said feedback shaft for torsional deflection thereby to develop a force proportional to the angular position of said shaft; a lever operatively connected with the other end of said torsion spring whereby said force may be transmitted to said balance beam so as to oppose the movement imparted thereto by said bellows means; and potentiometer means operatively connected with said feedback shaft for rotation thereby, the output of said potentiometer means being effective to vary the gain of said amplifier in accordance with the angular position of said shaft.

4. A force balance transducer comprising: a movable force balance member; first force applying means operatively engaging said member for exerting a first variable force on the member in one direction of movement thereof; means responsive to movement of said member for generating an electrical feedback signal related to the displacement of the member from a given position; an amplifier coupled to the output of said signal generating means for amplifying said signal; second force applying means coupled to the output of said amplifier and operatively engaging said member for exerting on the latter a second force which opposes said first force and is regulated in response to said signal, thereby to maintain said member in balance in said given position; means coupled to said amplifier for adjusting the amplifier gain; and means operatively connecting said gain adjusting means and said second force applying means for effecting adjustment of said amplifier gain in response to operation of said second force applying means to regulate said second force.

5. A force balance transducer comprising: a movable force balance member; means operatively engaging said member for exerting a first force on the member in one direction of movement thereof; means responsive to movement of said member for generating a feedback signal related to the displacement of said member from a given position; a lever having a movable fulcrum and operatively engaging said member for exerting on the latter a second force opposing said first force upon pivoting of said lever in one direction; means coupled to said signal generating means and operatively engaging said lever for producing on the latter a moment in said one direction which is regulated in response to said feedback signal to maintain said member in balance in said given position; and means operatively connecting said moment producing means and fulcrum for adjusting the position of the latter along said lever in response to operation of the latter means to regulate said moment.

6. A force balance transducer comprising: a movable force balance member; means operatively engaging said member for exerting a first force on the member in one direction of movement thereof; means responsive to movement of said member for generating a feedback signal related to the displacement of said member from a given position; a lever having a movable fulcrum and operatively engaging said member for exerting on the latter a second force opposing said first force upon pivoting of said lever in one direction; means coupled to said signal generating means and operatively engaging said lever for producing on the latter a moment in said one direction which is regulated in response to said feedback signal to maintain said member in balance in said given position; and cam positioning means operatively connecting said moment producing means and fulcrum for adjusting the position of the latter along said lever in response to operation of the latter means to regulate said moment.

7. A force balance transducer comprising: a movable force balance member; means operatively engaging said member for exerting a first force on the member in one direction of movement thereof; means responsive to movement of said member for generating a feedback signal related to the displacement of said member from a given position; a lever having a movable fulcrum and operatively engaging said member for exerting on the latter a second force opposing said first force upon pivoting of said lever in one direction; means coupled to said signal generating means and operatively engaging said lever for producing on the latter a moment in said one direction which is regulated in response to said feedback signal to maintain said member in balance in said given position; said moment producing means including a rotary shaft which is rotatably positioned in accordance with said feedback signal; and cam means operatively connected to said shaft and fulcrum for adjusting the latter along said lever in response to rotation of said shaft.

References Cited in the file of this patent
UNITED STATES PATENTS

| | | |
|---|---|---|
| 1,131,953 | Pilkington | Mar. 16, 1915 |
| 2,277,681 | Burdick et al. | Mar. 31, 1942 |
| 2,300,810 | Robins | Nov. 3, 1942 |
| 2,322,031 | Kuebert | June 15, 1943 |
| 2,453,861 | Rothwell | Nov. 16, 1948 |
| 2,465,775 | White | Mar. 29, 1949 |
| 2,557,092 | Garbarini | June 19, 1951 |
| 2,595,813 | Raney | May 6, 1952 |
| 2,598,674 | Burgess | June 3, 1952 |
| 2,634,747 | Markson | Apr. 14, 1953 |
| 2,713,795 | Herndon | July 26, 1955 |
| 2,729,780 | Miller et al. | Jan. 3, 1956 |
| 2,734,949 | Berry | Feb. 14, 1956 |